Patented July 25, 1933

1,920,139

UNITED STATES PATENT OFFICE

GEORGE W. CROSBY, OF WOODCLIFF, NEW JERSEY, ASSIGNOR TO BAKELITE CORPORATION, OF NEW YORK, N. Y., A CORPORATION OF DELAWARE

RUBBER VULCANIZATION MOLD

No Drawing. Application filed March 7, 1929. Serial No. 345,241.

This invention relates to the construction of molds for vulcanizing rubber and a composition suitable for their preparation.

Molds used for the shaping and vulcanizing of rubber articles, as for example in the manufacture of rubber tires, are as a rule comprised of machined steel sections. But the production of a surface design in steel, particularly for a large mold, is evidently a costly procedure, and consequently it has been proposed to replace the steel sections with sections made of a phenolic resinoid, that is, a condensation product obtained in the reaction of phenol, cresol or other phenolic body with formaldehyde or other agent engendering formaldehyde or equivalent aldehyde and characterized by the property of being transformed from a fusible or potentially reactive state to an infusible state by the action of heat. Such a product has the capability of accurate molding under pressure to dimension so that sections repeating a design can be molded from a single die and thus the extensive machining necessary with steel sections can be avoided. However, rubber during vulcanization exhibits a tendency to stick to the surface of a tire or equivalent mold made from phenolic resinoids alone or admixed with wood flour or asbestos, the customary fillers, and imperfections in the molded rubber articles are caused thereby.

According to the present invention phenolic resinoids are made available for the manufacture of rubber mold sections by adding to such resinoids a filler containing finely divided mica, that is, mica ground sufficiently fine to pass through a 60 and preferably 80 mesh screen. It is found that rubber during vulcanization does not adhere to the surface of a section molded from such a mixture, and no dusting with talc or the like or any other preliminary treatment of the mold surface is required.

The filler is not necessarily limited to mica alone, and other fibrous or granular inorganic materials may be included, such as asbestos, graphite, lime, etc.; or cotton flock, wood flour, and similar organic materials can be added if the vulcanization temperatures are not high enough to cause injury. The mica moreover need not constitute the major portion by weight of the filler, if added in sufficient amount to insure its presence at or near the mold surface and to impart the property of non-sticking when rubber is vulcanized in contact therewith. As low as 5% by weight of mica has been found to give a satisfactory composition for this purpose.

The compounding of the mixture of binder and filler requires no material change from the usual procedure followed in mixing wood flour and a phenolic resinous binder. A mixture found suitable for this purpose comprises about 40% of a phenolic resinoid in a potentially reactive condition and from 5 to 60% of mica, the balance if any being any other filler, such as wood flour, asbestos, aluminum or other metallic powders, etc. The molding of the composition or mixture to form sections of the rubber vulcanization mold follows the standard practice of plastic molding, that is, charging a mold, preferably hot, with the composition and then submitting the charge to a pressure of from 1000 to 2000 pounds to the square inch and heating to a temperature of about 150 to 175° C. for a few minutes, and thereupon discharging the molded product either from the hot mold or after cooling the mold to some extent.

Rubber articles vulcanized in molds made of the composition here disclosed accurately embody the smallest detail of the mold surface. Since a mold section itself is a molded article, and it is characteristic of molded phenolic resinoid products that a high glossy surface is possible if the metal mold in which they are made is sufficiently polished, a smooth surface can be imparted to the rubber articles made with mold sections of the composition and without necessitating any further treatment.

Molds made from the mica composition can be used in the same manner and subject to the pressures and temperatures that are in common use in the vulcanization of rubber, if properly reinforced. In order that heat may be efficiently applied and abstracted from the rubber article, it is preferable to have the composition sections as thin as practical and supported within an iron or steel shell or skeleton to give the requisite strength; heat conductivity is also assisted by including aluminum or other metallic powder in the composition. These sections can be made replaceable or interchangeable and molded from a single die, and it then becomes a relatively simple and inexpensive matter to substitute or change the designs of the molding surface in whole or in part.

The invention has useful applications in the field of rubber vulcanization besides tire molds. In the manufacture of rubber heels or rubber goods for mechanical or general use, for example, it is customary to have a large number of metal molds to accord with the various designs, trade marks, insignia, etc., required by customers, and they are repeated for each size of heel or other article; the customary method of manufacture is that of engraving, hobbing or pressing the design, etc., into each metal mold. By the present invention these molds can be supplied entirely of the composition herein described properly reinforced, or that portion carrying the design or other distinguishing marks can be molded from the composition either in a metal mold or made as a separate section fitting into a cavity in a metal mold which section may be removable and replaceable by other sections or may be cemented or otherwise secured in place. A very material reduction of mold cost is thereby made possible.

I claim:

1. A rubber vulcanization mold having as a contact surface a heat-resistant plastic composition including mica as a filler.

2. A rubber vulcanization mold having as a contact surface sections molded from a composition comprising a phenol-aldehyde resinoid as a binder and a filling material including finely divided mica.

3. A rubber vulcanization mold having as a contact surface of a composition comprising about 40 per cent of a phenol-aldehyde resinoid, about 5 to 45 per cent of finely divided mica and about 55 to 15 per cent of other organic or inorganic filler.

4. A rubber vulcanization mold having a portion of its contact surface formed from a composition comprising a phenol-aldehyde resinoid as a binder and a filling material including finely divided mica.

5. A rubber vulcanization mold having a portion of its contact surface formed from a composition comprising a phenol-aldehyde resinoid as a binder and a filling material including finely divided mica, the remainder of said contact surface being metal.

6. A mold of metal having a portion of its contact surface carrying distinguishing marks molded from a phenol-aldehyde composition containing mica.

7. A method of preparing molds which comprises forming a metal mold with a cavity in that portion of the contact surface intended to carry distinguishing marks, and molding a phenol-aldehyde composition containing mica as a filler with said distinguishing marks in said cavity.

8. A mold comprising a metal body having a portion of its contact surface molded from a phenol-aldehyde composition containing mica as a filler and the remainder of the contact surface being metal.

9. A mold suitable for rubber vulcanization comprising a metal body having a portion of its contact surface molded from a phenol-aldehyde composition containing mica.

10. A rubber vulcanization mold having a contact surface section molded from a composition comprising a phenol-aldehyde resinoid and a filler, said filler comprising mica and other filling material.

GEORGE W. CROSBY.